United States Patent [19]

Cunningham

[11] 4,278,106
[45] Jul. 14, 1981

[54] PLATE CHECK VALVE

[76] Inventor: William W. Cunningham, P.O. Box 425, Exeter, Calif. 93221

[21] Appl. No.: 77,161

[22] Filed: Sep. 20, 1979

[51] Int. Cl.³ ............................................. F16K 15/08
[52] U.S. Cl. ............................ 137/512.1; 137/516.13; 137/516.15; 251/361
[58] Field of Search ........... 137/512.1, 516.13, 516.15, 137/516.17; 251/361, 363; 417/559, 562

[56] References Cited

U.S. PATENT DOCUMENTS

| 301,821 | 7/1884 | Kroog | 137/543.19 X |
|---|---|---|---|
| 1,324,137 | 12/1919 | Wikander | 137/516.3 |
| 1,616,128 | 2/1927 | Knox | 417/562 X |
| 2,719,002 | 9/1955 | Glomb | 137/512.1 X |
| 3,358,710 | 12/1967 | Page | 137/512.1 |
| 3,829,253 | 8/1974 | Bunn et al. | 137/512.1 X |

Primary Examiner—William R. Cline
Attorney, Agent, or Firm—Huebner & Worrel

[57] ABSTRACT

A plate check valve having a housing for mounting across a fluid passsageway to prevent reverse flow therein; a cage detachably mounted on the housing; a plurality of annular, planar, coaxial, radially spaced seat plates releasably clamped between the housing and the cage; and a plurality of axially movable, annular, planar valve plates individually related to and overlapping the spaces between the seat plates, the valve plates moving into engagement with the seat plates to prevent reverse flow through the valve and from the seat plates for normal flow through the valve.

16 Claims, 7 Drawing Figures

PLATE CHECK VALVE

BACKGROUND OF THE INVENTION

1. Field of the Invention

The present invention relates to a plate check valve for use in a reciprocating compressor or the like, and more particularly to such a valve having seats which are durable and are quickly and economically replaced.

2. Description of the Prior Art

Check valves using movable plates are well known and, typically, are employed in large reciprocating compressors of the type utilized for ammonia refrigeration. However, existing valves of this type have a number of deficiencies. A plate of such a check valve moves toward and from a seat circumscribing a flow passage. When the plate is seated it closes the passage, preventing reverse flow through a cylinder of the compressor. In normal operation of the compressor, the plate impacts the seat at each piston stroke within the cylinder. This normally occurs approximately 340 times a minute. This hammering action of the plate against the seat eventually destroys the seat. In existing valves of this type, the seat is an integral part of a housing for the plate. As a result, the entire housing must be replaced at relatively great expense when the seat is destroyed during the normal operation of the valve.

The seats of plate valves used in closed systems, such as refrigeration systems, are particularly subject to destruction due to movement of a valve plate toward its seat. The piping of such systems is assembled primarily by welding with the result that "trash", relatively hard and irregularly shaped bits of slag and metal from the welding operation, remain in the system. This trash is carried through the system into the compressor check valves where the trash is hammered onto the valve seats by the plates, destroying the seats after the system has operated for a relatively short period of time.

The seats of compressor check valves utilized in refrigeration service are also subject to breakage due to the ingestion of a slug of refrigerant liquid. The stress due to the sudden drop from a vapor temperature of 5° to 10° C. (41° to 50° F.) to a liquid temperature of −29° C. (−20° F.) is frequently sufficient to fracture the valve seats which, typically, are constructed of cast iron or other ferrous materials which are relatively brittle at such temperature. While other materials, such as aluminum alloys, do not become embrittled under refrigerant temperatures, they are too soft to withstand the normal hammering action of the plates when used for a plate valve seat.

Typically, plate check valves for large reciprocating compressors are supplied in replaceable units, each unit having one or more plates and a housing therefor. The housing has a relatively complicated shape since it conforms to the surfaces of the compressor on which the valve is mounted and, typically, is provided with a plurality of plate seats, a plurality of fluid passages, bores for mounting bolts, and the like. As a result, although each valve unit is relatively simple to replace, its cost of replacement is substantial due to the complicated construction of the housing.

PRIOR ART STATEMENT

In conformance with 37 C.F.R. 1.97 and 1.98, the applicant states that he is not aware of any prior art which is relevant to the patentability of the subject invention.

SUMMARY OF THE INVENTION

It is an object of the present invention to provide an improved plate check valve for use with reciprocating compressors.

Another object is to provide such a valve having a seat which is economically and quickly replaced when damaged by normal operation or by the ingestion of trash.

Another object is to provide such a valve having a seat which is resistive to wear due to impact action of a valve plate thereon in normal reciprocating compressor operation and which will withstand the hammering of trash thereon by the plate.

Another object is to provide such a valve which effectively prevents reverse flow and leakage of fluid being compressed by a reciprocating compressor.

Another object is to provide such a valve which is interchangeable with existing check valves.

Another object is to provide such a valve which is lighter in weight than existing, interchangeable check valves adapted for mounting on a compressor piston.

Another object is to improve the durability of check valves.

These and other objects and advantages are obtained by a plate check valve having a housing and seat of simple shape and economical construction which is easily and quickly detachable from the housing.

DESCRIPTION OF THE PREFERRED EMBODIMENT

Referring with greater particularity to the drawings, a plate check valve embodying the principles of the present invention is shown at 20. The valve is fixedly mounted on a fragmentarily represented piston 30. The piston is of a well-known form utilized in relatively large, single-acting refrigeration compressors, having a check valve which forms the crown of the piston and reciprocates with it. The valve of the present invention is a unit which is mounted on the piston.

The piston 30 is of the usual cylindrical form and has an upper axially facing, planar, annular crown end 31. The crown end has a socket, indicated generally by the numeral 32, extended axially therein to receive the check valve 20. The interior of the piston is hollow and defines a generally cylindrical passage 34 extending axially through the piston and opening into the socket for fluid flow axially of the piston toward the crown end in a direction indicated by the arrow 35. The exterior of the piston is provided with a pair of grooves 37 to receive piston rings, not shown.

The socket 32 has a cylindrical surface 40 concentrically related to the crown end 31 and extending downwardly therefrom to a coaxially related, frusto-conical surface 42. This surface has a smaller diameter, lower end 43 formed by its intersection with an annular planar surface 45 disposed normally to said cylindrical surface. Said annular surface has a central circular opening 46 through which the flow passage 34 opens into the socket. A plurality of screw-threaded bores 48 extend axially downwardly from said surface in circumferentially spaced relation about said opening.

Figure 2:
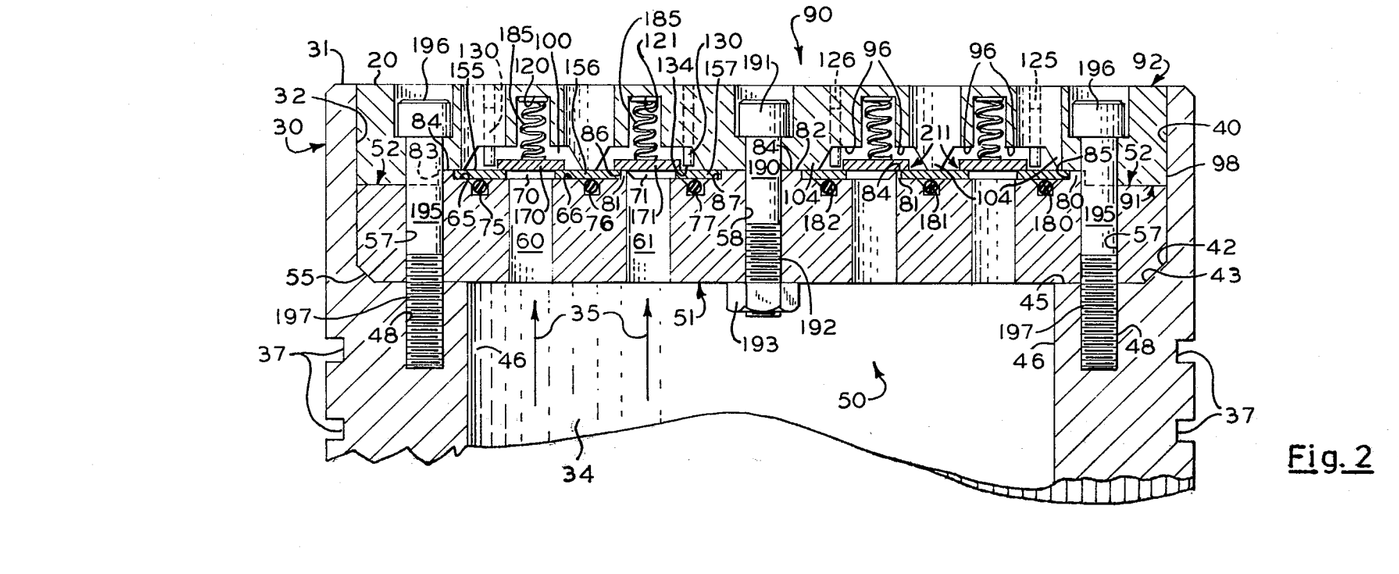
FIG. 2 is a diametrical section of the valve and piston of FIG. 1 at an enlarged scale, taken on line 2—2 of FIG. 1 with the piston fragmentarily represented.
Figure 3:
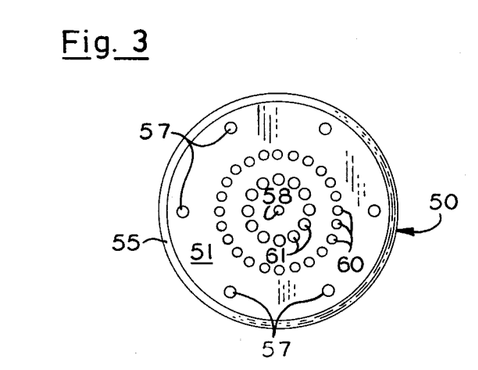
FIG. 3 is an axial view of the valve taken in a direction opposite to that of FIG. 1 and at the same scale.
Figure 5:
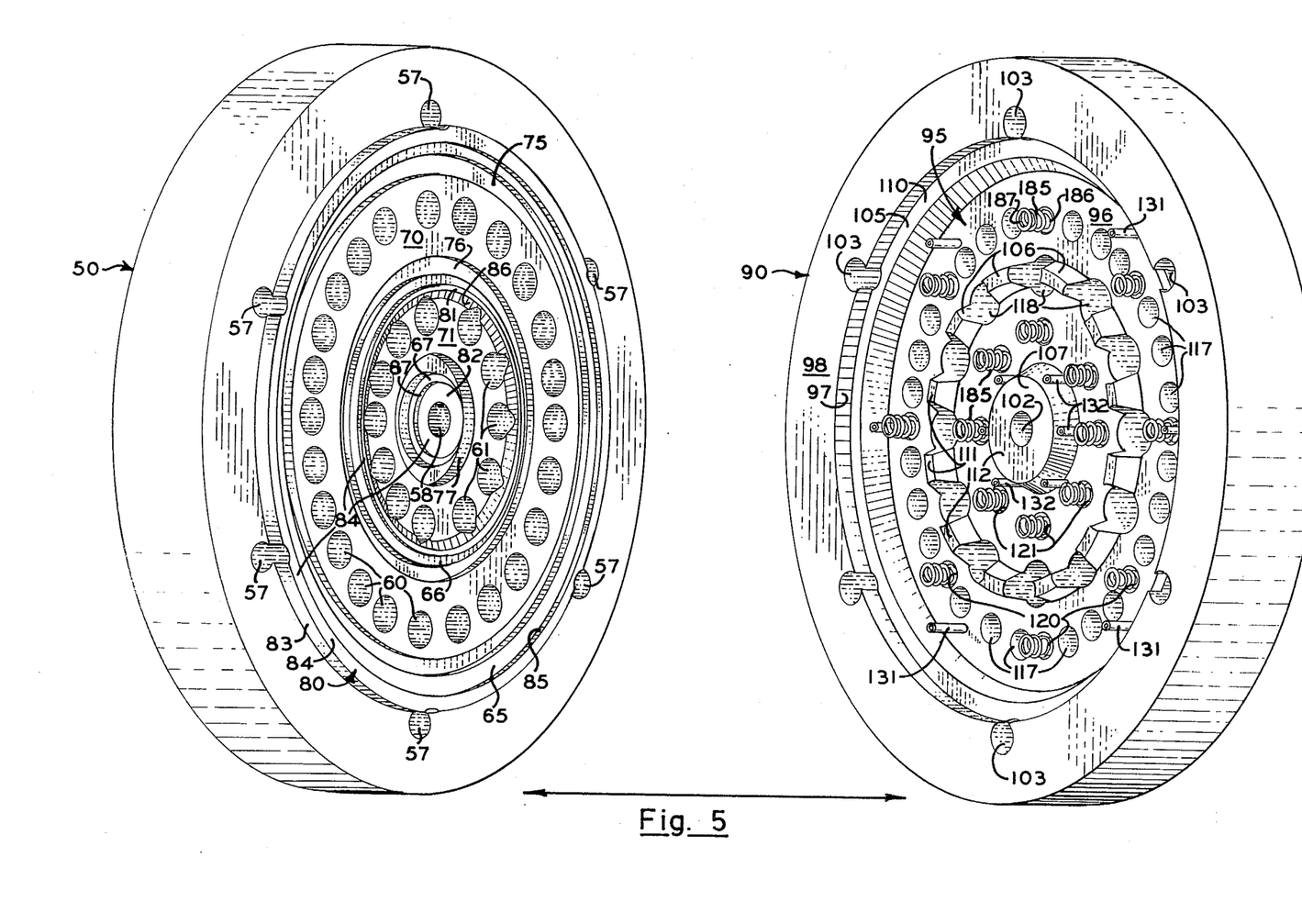
FIG. 5 is a partially exploded perspective view of the housing and the cage.
Figure 6:
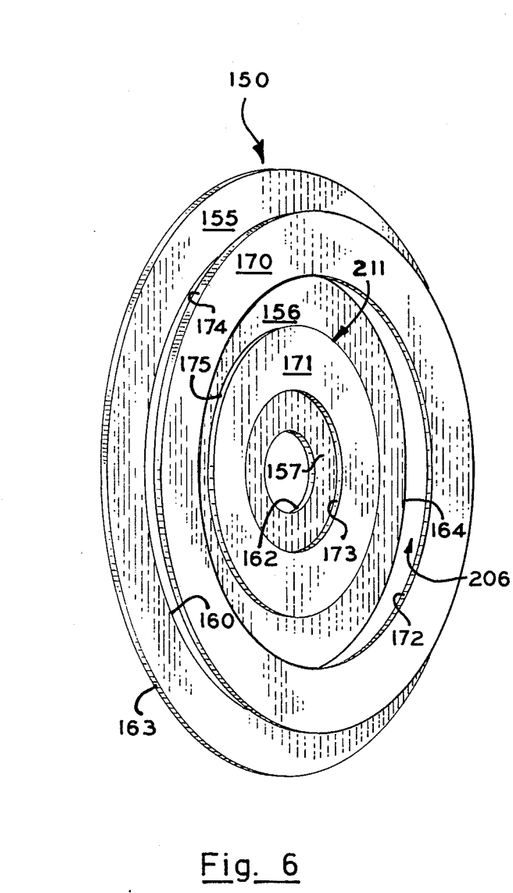
FIG. 6 is a perspective view of the plates disposed in their assembled relation with one of the valve plates in a closed position and another in an open position.

The check valve 20, as best shown in FIGS. 2, 3, and 5, has a cylindrical, drum-like housing 50, which is preferably unitarily constructed of aluminum or an alloy thereof. The housing has a planar first axial surface 51 disposed toward the opening 46 and has an opposite, generally planar second axial surface 52. The first surface and the second surface thus face, respectively, toward and oppositely of the direction of flow indicated by the arrow 35. Said surfaces are spaced axially approximately one-half of the axial distance between the crown end 31 of the piston 30 and the annular surface 45 of the socket 32. The exterior diameter of the housing is slightly less than the diameter of the cylindrical surface 40 of said socket so that the housing is slidably fitted therein. The periphery of the first surface is provided with a chamfer 55 which conforms to the frusto-conical surface 42. The housing has a plurality of mounting bores 57 extending axially therethrough and circumferentially spaced thereabout in a circle disposed in inwardly adjacent relation to the chamfer. These bores are equal in number to the bores 48 and are aligned therewith. The housing also has a coaxial, centrally disposed bore 58.

The housing 50 has a plurality of first or outer inlet ports or passages 60 disposed in a circle which is smaller in diameter than the circle of the mounting bores 57. The housing has a plurality of second or inner inlet ports or passages 61 disposed in a circle which is, in turn, smaller in diameter than the circle of said outer passages. Said circles are coaxially related to the housing and their diameters are such that, radially of the housing, the spacing between the mounting bores and the outer passages is approximately equal to the spacing between the outer and inner passages and is, in turn, approximately equal to the spacing between the inner passages and the central bore 58. The individual outer and inner passages are formed by circular bores which are substantially parallel to the axis of the housing. The diameters of said passages are substantially equal, each being somewhat smaller in diameter than one-half of said spacing between their respective circles. The passages are closely spaced circumferentially about their respective circles.

The second surface 52 of the housing 50 has an annular outer face 65, an annular intermediate face 66, and an annular inner face 67. These faces are disposed in concentric, coplanar relation and are coaxially related to the housing. The outer and intermediate faces are separated by an outer annular space 70 and the intermediate and inner faces are separated by an inner annular space 71. Radially of the housing, the outer circular edge of the outer space is disposed in outwardly closely adjacent relation to the outer passages 60 and the inner circular edge of said space is disposed oppositely of said passages in closely adjacent relation thereto. The outer and inner circular edges of the inner space are correspondingly disposed in relation to the inner passages 61. Each outer and inner passage thus extends individually from the first surface 51 of the housing and opens into the corresponding annular space, establishing fluid communication between said surface and said space. The faces 65, 66, and 67 have respective coaxial annular grooves 75, 76, and 77 disposed radially centrally thereof. The grooves have an approximately square cross section and are substantially narrower than their respective faces. The edges of said grooves disposed oppositely of the first surface 51 are slightly chamfered.

The housing 50 has an outer annular rib 80, an intermediate annular rib 81, and an inner annular boss 82 which, respectively are related to the coplanar faces 65, 66, and 67. The outer rib has an exterior cylindrical surface 83 which is coaxially related to said faces and is inwardly adjacent the mounting bores 57. Said ribs and boss extend from the faces axially oppositely of the second surface for substantially equal distances, terminating in individual planar axial end surfaces 84 which are coplanar, parallel to the faces, and spaced axially somewhat therefrom. The outer rib extends radially inwardly from its respective one of said surfaces to the outer edge of the outer face 65, terminating thereat in an interior cylindrical surface or shoulder 85 aligned therewith. The intermediate rib has an outwardly facing cylindrical surface or shoulder 86 aligned with the inner edge of the intermediate face 66. The boss circumscribes the central bore 58 and extends outwardly therefrom, terminating in a cylindrical surface or shoulder 87 aligned with the circular inner edge of the inner face 67.

The check valve 20 has a cylindrical, drum-like cage 90, best shown in FIGS. 1, 2, 5, and 7, mounted on the second surface 52 of the housing 50. The cage is preferably constructed of the same type of material as the housing. The cage is concentric with the housing and has substantially the same outside diameter. The cage has a generally planar first surface 91 facing the housing and an axially opposite, planar second surface 92. The thickness of the cage is such that, when the valve is received in the socket 32, the second surface lies substantially in the same plane as the end 31 of the piston. Said first surface has a depression 95 which terminates oppositely of the housing in a planar surface 96. This surface extends substantially parallel to the plane of the faces 65, 66, and 67 and is spaced axially therefrom a distance of approximately 6 to 7 mm. ($\frac{1}{4}$ of an inch) when the cage is mounted on the housing in assembled relation thereto. The depression has a cylindrical outer wall 97 which is slidably fitted to the cylindrical exterior surface 83 of the outer rib 80 and positions the housing and the cage in concentric relation. The second surface of the cage has an outer planar annulus 98 circumscribing said outer wall and extending parallel to said planar surface. The depression and the second surface 52 of the housing thus defined a cylindrical chamber 100 disposed between the housing and the cage.

The cage 90 has a central bore 102 and a plurality of peripherally disposed mounting bores 103 which extend through it axially between its first surface 91 and its second surface 92. The ends of said bores adjacent to said second surface are provided with individual counterbores. Said central bore is aligned with the central bore 58 of the housing 50 and said peripheral bores are individually related to and are circularly arranged in alignment with the mounting bores 57 thereof.

The cage 90 has a clamping portion formed by a plurality of first protuberances 104 which are integral with the balance of the cage. Said protuberances include an outer protuberance 105, a plurality of circularly disposed intermediate protuberances 106, and an inner protuberance 107. The protuberances extend axially from the surface 96 toward the housing 50 to respective coplanar distal ends 110, 111, and 112. Said ends are parallel to the surface 96 and are spaced axially therefrom a substantially lesser distance than the annulus 98. The outer protuberance is extended axially of the cage toward the periphery of the outer face 65 of the housing and forms an annular step at the intersection of the surface 96 and the wall 97. The intermediate protuberances are disposed to form a castellated annular rib. This rib extends axially of the cage toward the intermediate face 66. Radially, this rib is aligned with said face, but is substantially narrower. The inner protuberance forms an annular boss about the central bore 102. Said boss is substantially larger in diameter than the boss 82 of the housing. The inner protuberance thus extends axially of the cage toward the central edge of the inner face 67.

The cage 90 has a plurality of ports or outlet passages 115 extending through it axially between its second surface 92 and the depression 95. These passages thus establish fluid communication between said surface and the chamber 100. Said passages are circular bores of approximately the same diameter as the passages 60 and 61 in the housing 50. The outlet passages are disposed in a circularly arranged outer group 117 and in a circularly arranged inner group 118. The passages of the outer group are circumferentially spaced about a circle whose diameter is approximately equal to the diameter of the radial center of the outer face 65 of the housing 50. The outer portion of each passage in said group thus extends through the annular first protuberance 105. The passages of the inner group are circumferentially spaced about a circle whose diameter is approximately equal to that of the ring of the second protuberances 106 so that said passages form the spaces between said protuberances. The passages in the inner group are closely spaced while the outer group has an equal number of passages spaced a greater distance apart.

The cage 90 has a plurality of outer blind bores 120 disposed in a circle which is equally spaced between the groups 117 and 118 of passages 115. The cage has a plurality of inner blind bores 121 equal in number to said outer bores. The inner bores are disposed in a circle equally spaced between the inner group of said passages and the periphery of the inner protuberance 107. The blind bores are substantially identical, are smaller in diameter than said passages, and extend axially into the cage from its planar surface 96 toward its second surface 92. It will be noted that the axes of the outer and inner bores extend, respectively, toward the outer space 70 and inner space 71 of the housing 50.

The cage 90 has a plurality of outer small bores 125 equally circumferentially spaced about a circle which is inwardly adjacent to the annular first protuberance 105. The axes of said bores are substantially parallel to axes of the faces 65, 66, and 67 of the housing 50 and extend toward the outer face 65 of the housing adjacent to the outer annular space 70. The cage has a plurality of inner small bores 126 equally circumferentially spaced in a circle which is outwardly adjacent to the annular inner protuberance 107. The inner bores are equal in number to said outer bores. The axes of the inner bores are parallel to the axes of said faces and extend toward the inner face 67 adjacent to the inner annular space 71. The small bores are substantially identical, are smaller in diameter than the blind bores 120 and 121, and extend through the cage between its second surface 92 and the planar surface 96.

The cage 90 has a guide portion formed by a plurality of second protuberances or pins 130. The pins are individually received in the bores 125 and 126. The pins are thus disposed in an outer circular group 131 and an inner circular group 132 corresponding, respectively, to the bores 125 and the bores 126. The pins are substantially identical and are tightly fitted in their respective bores fixing them in their position therein with respect to the cage. The pins preferably are well-known "roll" pins which are tubular and longitudinally split. Each pin has an axial end 134 disposed toward the housing 50 and has a cylindrical periphery or outer surface 135 which is parallel to the axes of the faces 65, 66, and 67. The pins are disposed with said ends spaced substantially equally from the planar surface 96. Said ends are spaced from this surface a distance somewhat less than the distance that distal ends 110, 111, and 112 of the first protuberances 104 are spaced therefrom. As best shown in FIG. 5, the pins in the outer group are disposed in radially outward relation to the outer annular space 70 of the housing. Therefore, a portion of the outer surface of each pin of said group faces said space and forms a guide surface 137 adjacent thereto. Similarly, the pins in the inner group are disposed in radially inward relation to the inner annular space 71, with a portion of the outer surfaces of said pins facing said space and forming guide surfaces 138 adjacent thereto.

The valve 20 has five circular, annular, washer-like sealing plates, shown in FIGS. 2, 4, 6 and 7 and indicated generally by the numeral 150, disposed in the chamber 100. The plates are substantially planar and have a common axis which is substantially coincident with the axes of the housing 50 and cage 90. The cage and the housing are thus generally parallel to the plates and are disposed axially oppositely thereof. Preferably, the plates are constructed of a material which is relatively harder than that of which the housing and the cage are constructed, heat treated saw steel being well suited to the purpose. The plates are substantially equal in thickness. This thickness is substantially equal to the axial spacing between the plane of the faces 65, 66, and 67 and the plane of the surfaces 84.

The plates 150, sometimes referred to as seats, include a first or outer seat plate 155, a second or intermediate seat plate 156, and a third or inner seat plate 157 which, respectively, are individually related to the faces 65, 66 and 67. The inner and outer diameters of said plates are substantially equal to the inner and outer diameters of their respective faces and said plates are flatly received thereon in coplanar, concentric relation. The outer, intermediate, and inner seat plates have respective inner circular edges 160, 161, and 162 and respective outer circular edges 163, 164, and 165. Therefore, the inner edges of the outer and intermediate plates are, respectively, adjacent to the passages 60 and 61 and the outer edges of the intermediate and inner plates, respectively, are adjacent to said passages. The outer and intermediate plates define an annular space 167 therebetween, and the intermediate and inner plates define a space 168 therebetween. Said spaces are substantially coextensive, respectively, with the spaces 70 and 71 and are in fluid communication therewith.

The plates 150 include an outer movable or valve plate 170 and an inner movable or valve plate 171 which, respectively, are individually related to the annular spaces 70 and 71 and, therefore, to the passages 60 and 61 and the spaces 167 and 168. The valve plates are disposed substantially in a common plane which lies between the seat plates 155, 156, and 157 and the first surface 91 of the housing. The outer and inner valve plates have respective inner portions or edges 172 and 173 and outer portions or edges 174 and 175. The diameters of the outer and inner edges of the outer valve plate are, respectively, somewhat larger than the diameter of the inner edge 160 of the outer seat plate 155 and smaller than the diameter of outer edge 164 of the intermediate seat plate 156. The diameters of the outer and inner edges of the inner valve plate are, respectively, somewhat larger than the diameter of the inner edge 161 of said intermediate plate and somewhat smaller than the diameter of the outer edge 165 of the inner seat plate 157. The sealing plates thus are of incrementally stepped diameters, and have their adjacent edges disposed in overlapping, coextensive relation adjacent to said passages. Therefore, the valve plates 170 and 171, respectively, extend radially across the passages 60 and 61. The seat plates lie in one plane adjacent to the faces 65, 66, and 67, facing and alternating with the valve plates which lie in another plane which is parallel to said one plane.

It will be noted that the shoulder 85 of the outer rib 80 is disposed radially outwardly of the outer edge 163 of the outer seat plate 155 and that the shoulders 86 and 87, respectively, are disposed radially inwardly of the inner edge 161 of the seat plate 156 and the inner edge 162 of the seat plate 157. Each of said edges is fitted to its respective shoulder for axially slidable movement of the corresponding plate toward and from its respective face 65, 66, or 67. The shoulders thus maintain the seat plates in their respective concentric relationship with the passages 60 and 61 when said plates are engaged or nearly engaged with their respective faces.

As best shown in FIGS. 2 and 5, the group 131 of the pins 130 is disposed outwardly of the outer valve plate 170 with the portions 137 of said pins engaged therewith radially of its outer edge 174. The portions 138 of the group 132 of said pins are disposed centrally of the inner valve plate 171 and are radially engaged with its inner edge 173. Said portions of the pins are loosely slidably fitted to the corresponding edges of the valve plates and maintain the plates substantially in coaxial relation to the seat plates 155, 156, and 157. The valve plates are thus constrained to move within the chamber 100 parallel to said portions of the pins, that is, toward and from the seat plates 155, 156, and 157.

Figure 4:
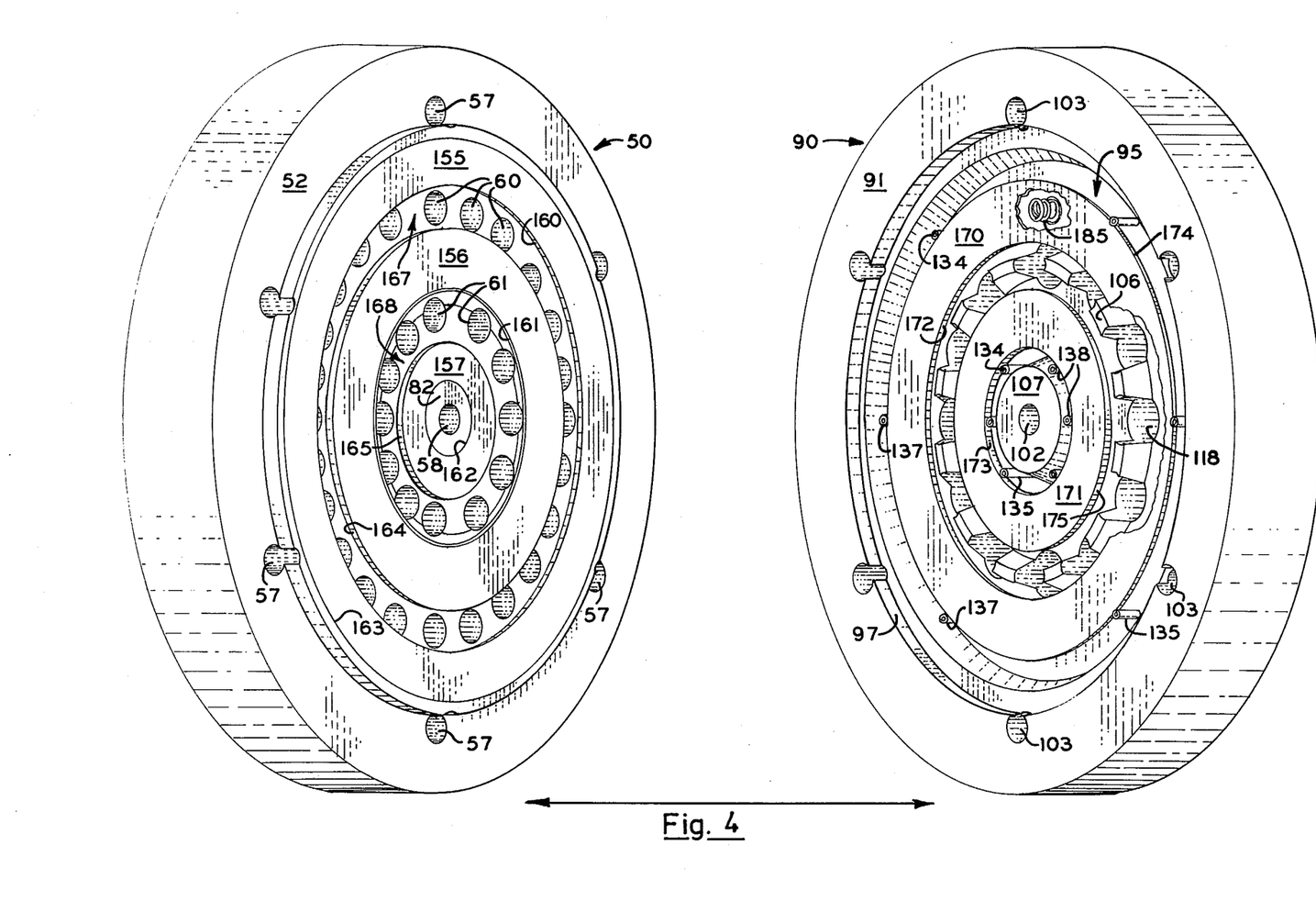
FIG. 4 is a partially exploded perspective view of the valve showing a housing engaged by three annular seat plates and a cage engaged by two annular valve plates. One of the seat plates is broken away for illustrative convenience.

Referring to FIGS. 2 and 4, it is seen that the check valve 20 is provided with three resilient O-rings 180, 181, and 182. These rings, respectively, are individually fitted to and received in the grooves 75, 76, and 77 beneath the seat plates 155, 156, and 157. The axial thickness of the rings is somewhat greater than the axial depth of their respective grooves. As a result, when said plates are flatly engaged with their respective faces 65, 66, and 67, the resilient rings are compressed therebetween and substantially prevent fluid leakage radially of the housing between each plate and the corresponding face.

Figure 7:
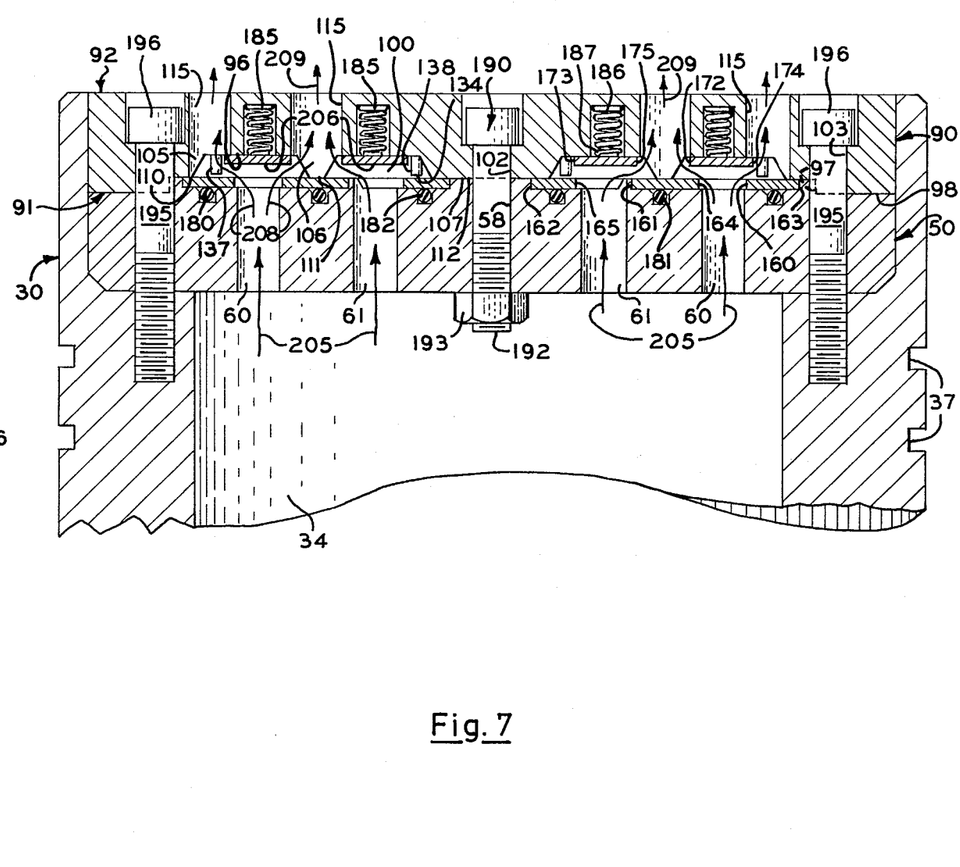
FIG. 7 is a fragmentary sectional view similar to FIG. 2 showing two of the plates in an alternate position.

The check valve 20 includes a plurality of substantially identical helical springs 185, best shown in FIGS. 5 and 7, individually fitted into the blind bores 120 and 121 in the cage 90. Each spring is of frusto-conical form having a larger diameter axial end 186 and an opposite smaller diameter end 187. The larger diameter ends are tightly slidably fitted to said bores so as to retain the springs therein. The springs in the outer circle of the bores 120 extend therefrom with their smaller diameter ends engaging the outer valve plate 170. The springs in the inner circle of bores 121 similarly engage the inner valve plate 171. As a result, the springs resiliently urge the valve plates toward the seat plates 155, 156, and 157. It will be noted that the outer valve plate and the inner valve plate are each provided with an equal number of said springs, but that the annular area of the outer plate is, of course, greater than the annular area of the inner plate. As a result, the force exerted by the springs on their respective plates in relation to the area of the plate is greater in the case of the inner plate than in the case of the outer plate.

Figure 1:
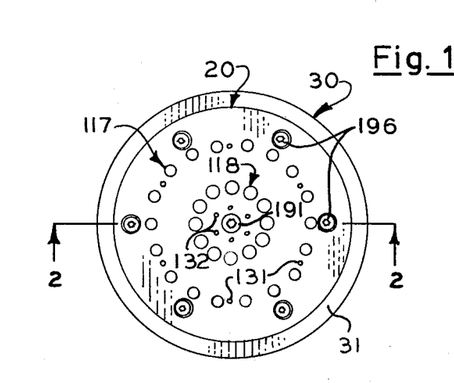
FIG. 1 is an axial view of a plate check valve embodying the principles of the present invention mounted on a compressor piston.

The check valve 20 has a central cap screw 190, shown in FIGS. 1 through 3, which extends through the aligned central bores 58 and 102, respectively, of the housing 50 and the cage 90. The cap screw is of conventional form having a head 191 provided with an hexagonal socket and having a screw-threaded shank 192. The head is received in the counterbore of the bore 102, and the length of the shank is such that it extends substantially from the bore 58. A nut 193 screw-threadably engages the shank and, when tightened against the housing, draws the housing axially toward the cage. As the cage and housing are drawn together, the seat plates 155, 156, and 157 are clamped between their respective faces 65, 66, and 67 and the corresponding distal ends 110, 111, and 112 of the protuberances 104 of the cage. Said screw and nut thus fix the cage and the housing in their assembled relation so that the check valve can be manipulated as a unit for installation into and removal from the socket 32 in the piston 30.

The valve 20 is installed in the socket 32 with each aligned pair of mounting bores 57 and 103 aligned with a corresponding one of the screw-threaded bores 48 and with the chamfer 55 of the housing 50 engaged with the frusto-conical surface 42. The check valve is provided with a plurality of mounting cap screws 195, each having a head 196 and a shank 197. Said shanks are adapted to screw-threadably engage said bores in the piston. The mounting cap screws, typically, are substantially identical to each other and to the central cap screw 190. When the valve is installed in the socket, the mounting screws are inserted through the aligned pairs of bores and tightened, fixing the valve in the socket and pressing the chamfer and the frustoconical surface into fluid-tight engagement.

OPERATION

The operation of the described embodiment of the present invention is believed to be clearly apparent and will be briefly summarized at this point. When the check valve 20 is assembled and secured in the socket 32, as shown in FIGS. 1 and 2, the valve plates 170 and 171 move axially within the chamber 100 toward and from the fixed seat plates 155, 156, and 157 to prevent fluid flow through the passage 34 in the direction opposite to that indicated by the arrow 35 and to provide relatively free fluid flow in the direction indicated thereby.

When the fluid pressure is higher in the direction of flow indicated by the arrow 35, fluid within the passage 34 enters the inlet passages 60 and 61, as indicated by the arrows 205 in FIG. 7. The fluid then flows through the coextensive pairs of annular spaces 70 and 167, and 71 and 168, urging the valve plates 170 and 171 axially from the seat plates 155, 156, and 157 in the the direction of the arrow 35 toward an open position 206 in which the valve plates engage the first surface 91 of the cage 90. During this movement the valve plates compress the springs 185 and are guided by the pins 130. As indicated by the arrows 208 the fluid then passes radially in opposite directions from each valve into the chamber 100. In relation to the outer valve plate 170, this flow is in a peripheral direction toward the outer seat plate 155 and in a central direction toward the intermediate seat plate 156. Said peripheral and central flows pass, respectively, between the corresponding pairs of overlapping edges 160 and 174, and 164 and 172. Corresponding flows occur simultaneously at the inner valve plate 171 when it is in said open position. From the chamber the fluid flows through the outlet passages 115 in the housing as indicated by the arrows 209 and continues in a direction substantially parallel to that in the passage 34 as indicated by the arrow 35.

As previously described, the force of the springs 185 engaging the inner valve plate 171 is greater in relation to the area thereof. As a result, a relatively low fluid pressure in the passage 34 is sufficient to move only the outer plate from the seat plates 155 and 156 so that the relative positions of the sealing plates are substantially that shown in FIG. 7. Therefore, as fluid flow gradually increases through the check valve 20, flow begins through it at the outer plate and then, as the flow increases, sufficient pressure differential is developed across the inner valve plate to move it from the seat plates 156 and 157.

When the difference in fluid pressure across the valve 20 in the direction 35 becomes relatively low or reverses so that fluid flow in the opposite direction can occur, the springs 185 resiliently urge the valve plates 170 and 171 toward the seat plates 155, 156, and 157. The force of the springs is augmented by fluid pressure when the pressure at the second surface 92 of the cage 90 is higher than that at the first surface 51 of the housing 50. In this event, the resultant pressure across the valve is in a direction from the outlet passage 115 in the cage 90 toward the inlet passages 60 and 61 in the housing 50. The combined resilient and pressure forces urge the valve plates toward the seat plates oppositely of the direction 35 into a closed position 211 shown in FIGS. 2 and 4. In said position the valve plates engage the seat plates in substantially fluid-tight engagement. As the valve plates move toward the seat plates, the valves are guided by the pins 130 into said engagement. When the plates are so engaged, the outer edge 174 of the outer valve plate 170 is engaged in fluid-tight, facing relation with the inner edge 160 of the outer seat plate 155, and the inner edge 172 of said valve plate is similarly engaged with the outer edge 164 of the intermediate seat plate 156. The edges 173 and 175 of the inner valve plate 171 are engaged in similar relation, respectively, with said intermediate seat plate and the inner seat plate 157 when the valve plates are in said closed position.

As the piston 30 reciprocates in normal compressing operation, the valve plates 170 and 171 move alternately between their open position 206 and their closed position 211. The movement toward the closed position is terminated by the impact of the valve plates on the seat plates 155, 156, and 157. In normal operation, this impact eventually damages the seat plates sufficiently that leakage occurs between the valve plates and the seat plates. In the check valve 20 of the present invention, the seat plates, which are constructed of a relatively hard material, can withstand many more such impacts before serious leakage develops than if the seat element were constructed of a less durable material such as cast iron. As previously described, when a relatively hard object, typically "trash" remaining in a piping system connected to a compressor provided with a piston similar to the piston 30, is present between a valve plate and a seat plate engaged thereby, the object is hammered onto the seat plate. Since the seat plate of the present invention is relatively hard, it is not likely to be damaged by such hammering of trash. However, damage cannot always be averted due to repeated hammering and the irregular shape and hardness of such trash. However, an embodiment of the present invention has operated continuously for over 25,000 hours without noticeable deterioration, distortion or wear.

In any event, when leakage develops through the sealing plates 150 due to damage to the seat plates 155, 156, and 157, the seat plates can be rapidly and conveniently replaced by detaching the cage 90 from the housing 50. To detach the cage, as best visualized from FIGS. 1, 2, and 4, the valve 20 is removed from the piston 30, by unscrewing the mounting screws 195 and the nut 193 unscrewed to release the central cap screw 190. The cage is thus released from the housing, so that the cage and housing can be separated as shown in FIG. 4. When so separated, the seat plates are, of course, no longer clamped between their respective faces 65, 66, and 67 and the protuberances 105, 106, and 107. The seat plates are thus released from the housing for removal therefrom as shown in FIG. 5. These plates are then replaced with new, undamaged plates. When the cage and housing are separated the valve plates 170 and 171 can, of course, also be replaced if desired. The new seat plates are slidably guided onto their respective seats by the shoulders 85, 86, and 87. When said new plates are mounted on the housing, the valve plates are placed coaxially thereon. The cage and the central screw and nut are then reinstalled in their previously described position, securing the sealing plates 150 between the housing and the cage. The assembled plate check valve of the present invention is then ready for continued use without having replaced the housing to correct leakage between a valve plate and a damaged seating element for said plate.

As previously described, the housing 50 and cage 90 are preferably constructed of an aluminum alloy. Such a material has the property of remaining relatively ductile under the usual temperatures of liquid refrigerants, in the order of −57° C. As a result, the contact of a quantity of such a liquid with these elements of the valve does not produce damaging temperature stresses. A housing constructed of such material is, of course, lower in weight than a prior art housing constructed of ferrous material to resist the impact of the valve plates. As a result, the use of a check valve 20 of the present invention results in a piston 30 having a lower reciprocating weight than that of an otherwise identical piston provided with a prior art check valve interchangeable with said valve. The fact that, in the check valve of the present invention, the seat plates 155, 156, and 157 are detachably mounted on the housing 50 thus not only provides for convenient repair, but provides a check valve whose elements are constructed from differing materials well suited for their respective functions.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A repairable check valve for refrigeration systems and the like comprising:
   A. a housing having a plurality of flat concentric annular faces radially separated by annular spaces through which exhaust ports extend;
   B. flat annular seats individually removably fitted against the faces in radially spaced relation to define annular passages therebetween in communication with the ports;
   C. flat annular valve plates individual to the annular passages marginally overlapping the seats which define their respective annular passages for movement between positions in sealing engagement with their respective seats and positions retracted therefrom; and
   D. a cage releasably connected to the housing and therewith defining a chamber containing the faces, seats, and plates and the cage providing passages communicating with the annular passages between the seats when the plates are retracted.

2. A plate check valve having
   A. an annular, planar valve plate having an inner, smaller diameter edge and an opposite outer, larger diameter edge,
   B. a first planar seat plate having a circular inner edge somewhat smaller in diameter than the outer edge of the valve plate,
   C. a second planar seat plate having a circular outer edge somewhat larger in diameter than the inner edge of the valve plate,
   D. a housing releasably mounting the seat plates in substantially coplanar, coaxial relation, and
   E. a cage fixed to the housing and mounting the valve plate in coaxial relation to the seat plates for movement to and from the seat plates between a closed position engaging the outer edge and the inner edge of the valve plate in substantially fluid-tight axially facing engagement with said inner edge of the first seat plate and said outer edge of the second seat plate and an open position retracted therefrom, the housing and cage extending parallel to and axially oppositely of the seat plates and said plates being releasably clamped between the housing and the cage, the housing having an inlet fluid passage opening between the seat plates, the housing and the cage defining therebetween a chamber extended axially from the seat plates beyond the valve plate wherein the valve plate has said movement toward and from the seat plates, and the cage having an outlet fluid passage opening into said chamber so that fluid entering the inlet passage urges the valve plate axially from the seat plates and passes into the chamber peripherally of the valve plate toward the first seat plate and centrally of the valve plate toward the second seat plate, and fluid pressure in a direction from the outlet passage toward the inlet passage urging the valve plate toward said fluid-tight engagement with the seat plates.

3. A plate check valve comprising
   a housing;
   a cage detachably mounted on the housing and defining a chamber therebetween; and
   a plurality of coaxially related, planar, washerlike sealing plates, the plates being of incrementally stepped diameters with the peripheral diameter of each plate being somewhat larger than the central diameter of the next larger diameter plate and being disposed in overlapping relation with alternate plates substantially lying, respectively, in two planes with each pair of adjacent plates in each plane defining a space radially therebetween, the plates in one of said planes being releasably clamped to the housing within the chamber, the housing having a plurality of fluid passages individually communicating with the spaces between the plates in said one plane, and the plates in said other plane being received in the chamber for movement axially toward the plates in said one plane into fluid-tight engagement therewith and for movement from said plates for fluid flow from the spaces between said plates in said one plane radially toward the adjacent plates.

4. The check valve of claim 3 wherein the housing is constructed of a material which is relatively soft and remains ductile at liquid refrigerant temperature, and the sealing plates are constructed of a material which is relatively hard and resistive to impact resulting from movement of the plates received in the chamber toward said engagement with the plates clamped to the housing.

5. The check valve of claim 3 further comprising resilient means for individually urging the plates received in the chamber toward the plates clamped to the housing, the force extended by said means in relation to the annular area of the plates received in the chamber being progressively greater as the diameter of said plates decreases.

6. A plate check valve for mounting on a member having a passage for the flow of fluid in a predetermined direction and a surface circumscribing the passage for the reception of the valve, the valve being disposed across the passage to prevent fluid flow in a direction opposite to said direction and comprising:
   A. a housing fixedly mounted on the surface having a first surface facing the direction of flow; an oppositely facing second surface; a plurality of planer, annular faces of different diameters disposed on the second surface in coplanar, radially spaced relation about a common axis; the faces defining a plurality of annular spaces on the second surface individually between said faces; and a plurality of ports, each port extending through the housing from the first surface into one of said spaces, having a width radially of said one space equal to or less than the width of said space and establishing fluid flow communication between said space and the first surface;
   B. a cage fixedly mounted on the second surface of the housing defining a chamber between the housing and the cage, the cage having a first surface facing the housing; an oppositely facing second surface; a port establishing fluid communication through the cage between the chamber and said second surface; a plurality of first protuberances extended axially from said first surface toward the housing, each protuberance extending towad one of said faces and bearing a distal surface substantially parallel thereto and spaced somewhat therefrom, and distal surfaces of said protuberances being substantially coplanar; and a plurality of second protuberances extending from said first surface toward the housing and bearing individual guide surfaces extended substantially parallel to said axis, said protuberances being disposed in a plurality of groups, each group being individually related to one of said annular spaces, being disposed adjacent thereto in a ring concentric with the respective space, and being extended axially from said first surface toward one of the faces adjacent to said one space;

C. a plurality of annular, planar, seat plates individually flatly received on said faces, each plate having an inner edge and an outer edge having diameters substantially equal to the corresponding diameters of the corresponding face and being clamped between said face and the distal surface of a corresponding first protuberance; and D. a plurality of annular, planar valve plates individually related to the spaces between the faces and having individual, radially opposite inner and outer edges spaced radially of the faces a distance somewhat greater than the radial width of the corresponding space, said plates being disposed in coaxial relation to the faces between the seat plates and the first surface of the cage for movement axially therebetween, each valve plate being engaged radially by the guide surfaces of the corresponding group of second protuberances for guidance in said movement and with the inner edge of each valve plate overlapping the outer edge of the adjacent, smaller diameter seat plate and the outer edge of each valve plate overlapping the inner edge of the adjacent larger diameter seat plate, said overlapping edges being urged into substantially fluid-tight engagement when the fluid pressure in said port in the cage is relatively greater than the fluid pressure at the first surface of the housing.

7. The check valve of claim 6 having resilient means disposed between each valve plate and the cage for resiliently urging said plate axially toward the adjacent seat plate.

8. The check valve of claim 6 in which each of said faces has a coaxial annular groove disposed radially centrally thereof, and each groove has an annular resilient member fitted therein for compression by the corresponding seat plate when said plate is clamped between the housing and a corresponding one of said distal surfaces, substantially preventing fluid leakage between said plate and the corresponding seat.

9. The check valve of claim 6 wherein each group of the second protuberances is a plurality of cylindrical pins fixedly mounted on the cage, the axes of the pins being substantially parallel to the axes of the seats and a portion of the periphery of each pin being disposed radially toward the corresponding valve plate defining one of the guide surfaces therefor.

10. A repairable check valve for refrigeration systems and the like comprising:

A. a housing having a plurality of flat concentric annular faces radially separated by annular spaces through which exhaust ports extend;

B. flat annular seats individually removably fitted against the faces in radially spaced relation to define annular passages therebetween in communication with the ports;

C. annular seals between the seats and the faces of the housing;

D. flat annular valve plates individual to the annular passages marginally overlapping the seats which define their respective annular passages for movement between positions in sealing engagement with their respective seats and positions retracted therefrom;

E. a cage releasaby connected to the housing and therewith defining a chamber containing the faces, seats, and plates and the cage providing passages communicating with the annular passages between the seats when the plates are retracted; and F. resilient means between the cage and the plates urging the plates into engagement with the plates.

11. The check valve of claim 10 in which the housing and cage are of aluminum and the seats and plates are of saw steel.

12. A check valve comprising:

A. a housing;

B. a pair of annular inner and outer seats mounted concentrically in the housing, the outer seat having an inner edge and the inner seat having an outer edge radially spaced from the inner edge of the outer seat and the housing having a port between said seats;

C. an annular valve plate marginally overlapping the outer edge of the inner seat and the inner edge of the outer seat;

D. means mounting the valve plate for movement between a position in sealing engagement with the seats and a position retracted therefrom, the mounting means having a passage therethrough in communication with the port of the housing when the valve plate is retracted; and E. means urging the plate into engagement with the seats.

13. A check valve comprising:

A. a housing having a pair of annular faces radially separated by an annular space through which port means extend;

B. inner and outer annular seats individually removably fitted against respective faces of the housing, the inner seat having an outer edge and the outer seat having an inner edge radially spaced to define an annular passage therebetween in communication with the port means;

C. an annular valve plate marginally overlapping the outer edge of the inner seat and the inner edge of the outer seat;

D. means releasably connected to the housing in overlaying relation to the seats and plates mounting the seats in fixed position on the faces and the plate for movement between a position in sealing engagement with the seats and a position retracted therefrom, said means having a passage in communication with the passage between the seats when the plate is retracted; and E. means resiliently urging the plate into engagement with the seats.

14. The check valve of claim 13 in which the seats and the plate are substantially planar.

15. The check valve of claim 13 in which the seats and the valve plate are substantially concentric.

16. The check valve of claim 13 further comprising means for guiding the valve plate toward the seat plates into said engagement of the edges thereof and said position retracted therefrom.

* * * * *

UNITED STATES PATENT AND TRADEMARK OFFICE
CERTIFICATE OF CORRECTION

PATENT NO. : 4,278,106
DATED : July 14, 1981
INVENTOR(S) : William W. Cunningham It is certified that error appears in the above-identified patent and that said Letters Patent are hereby corrected as shown below:

Column 12, line 52, change "planer" to ---planar---.

Signed and Sealed this

Twenty-second Day of September 1981

[SEAL]

Attest:

GERALD J. MOSSINGHOFF

Attesting Officer     Commissioner of Patents and Trademarks